The specification in this patent
is not in order.
PATENTED MAY 6, 1836.
9641X
B. & A. TODD.
FEATHER RENOVATOR.
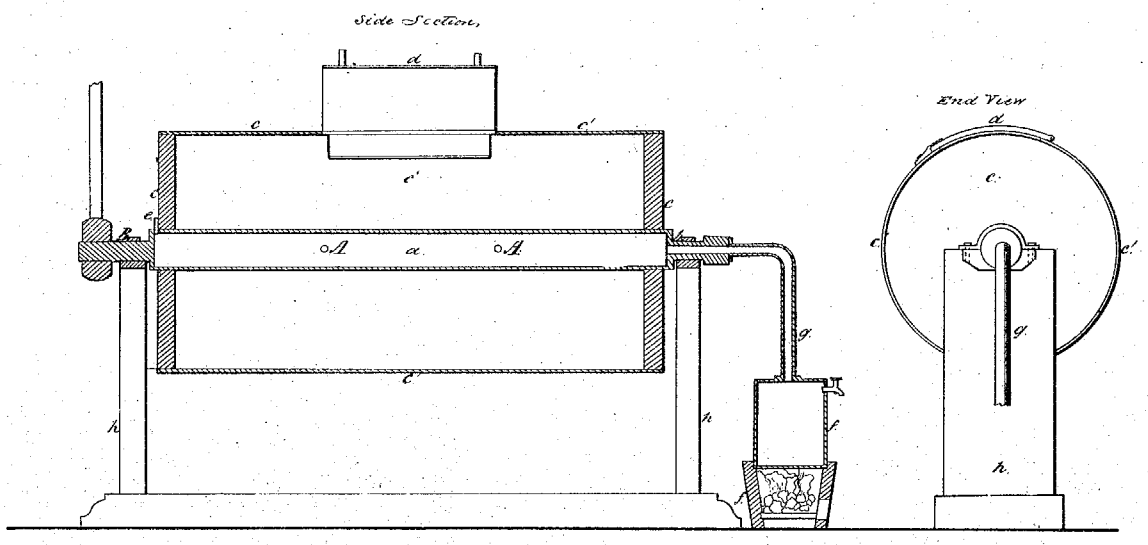

9641 X

Billy Todd and Alasen Todd. May 6, 1836

Letters Patent.

The schedule referred to in these Letters Patent and making part of the
same containing a description in the words of the said Billy Todd and
Alanson Todd themselves of their improvement in the Steam Feather Re-
novator. — To all to whom these presents shall come
Be it known that we Billy Todd of Marietta in the County of
Washington and State of Ohio, and Alanson Todd of Poultney in the County
of Rutland and State of Vermont, have invented a new and useful im-
provement in the mode of cleaning and renovating feathers called "the Steam
Feather Renovator" and that the following is a full and exact description
of the construction and operation of the said Steam Feather Renovator as in-
vented or improved by us - This machine consists of an iron or tin
steam pipe about six inches in diameter and about six feet and one half
in length, with a head and gudgeon in each end; one of said gudgeons is hollow
through which the steam is introduced, and the other gudgeon has a pulley or
crank attached to it by which the whole machine is turned, about one
inch from each end of the steam pipe, there is a head or collar fastened on which
is about three feet in diameter and may be made of boards, and may be formed
round, four, eight or any other number of squares, these collars have a cover-
ing from one to the other somewhat like a rolling screen. This covering
may be made of cloth, tin, or thin boards with a door on one side to put in
and take out the feathers. There are two small holes in the side of the
steam pipe, about one third its length apart and from each end, and one
other, in the end to which the crank is attached, which are stopped or open-
ed by valves or stoppers. There is a small boiler set in a stove or fur-
nace near the hollow gudgeon, and a small pipe conducts the steam from
the boiler through the hollow gudgeon into the steam pipe, this machine
is hung by the two gudgeons on two posts, the door is opened in the side
to put in the feathers, the door is then closed and fastened by hooks or straps
the small hole in the end of the steam pipe is stopped, and the holes in 9641 X  May 6, 1836 on the side of the steam pipe are opened and the steam is conducted from the boiler to the steam pipe and admitted through the holes into the feathers.

The machine is then put in a slow rotary motion, until the feathers are effectually steamed to cleanse and purify them from all disagreeable smells and to destroy any moths that may be in them. the small holes in the end is then opened and the two holes in the side are stopped, the steam passing through the steam pipe dries the feathers, the motion of the machine raises and enlivens them, by their own friction, and in a few minutes they become dry and completely cleansed and have the appearance of new feathers. What we claim as our improvement in the above described machine, not known or used before our application, is the application of steam in cleansing, drying, and renovating feathers, in the manner above specified particularly by means of the hollow shaft, and valves.

In testimony that the above is a true specification of our said improvement, as above described, we have hereunto set our hands the 21st day of March A.D. 1836 in presence of two Witnesses.

Witnesses
Dan^l P. Neal
W^m H. Thompson

Billy Todd.
Alanson Todd.

[illegible]